United States Patent [19]

Sezan et al.

[11] Patent Number: 4,731,863
[45] Date of Patent: Mar. 15, 1988

[54] DIGITAL IMAGE PROCESSING METHOD EMPLOYING HISTOGRAM PEAK DETECTION

[75] Inventors: Muhammed I. Sezan, Rochester; Ralph Schaetzing, Pittsford, both of N.Y.

[73] Assignee: Eastman Kodak Company, Rochester, N.Y.

[21] Appl. No.: 848,509

[22] Filed: Apr. 7, 1986

[51] Int. Cl.$^4$ .................................................. G06K 9/52
[52] U.S. Cl. ...................................... 382/51; 358/282; 358/284; 364/414
[58] Field of Search ................... 382/51; 358/282, 284; 364/414; 307/351; 328/150, 115

[56] References Cited

U.S. PATENT DOCUMENTS

| | | | |
|---|---|---|---|
| 3,999,047 | 12/1976 | Green | 382/51 |
| 4,276,473 | 6/1981 | Kato et al. | 250/327.1 |
| 4,302,672 | 11/1981 | Kato et al. | 250/327.1 |
| 4,310,886 | 1/1982 | Kato et al. | 364/414 |
| 4,315,318 | 2/1982 | Kato et al. | 364/515 |
| 4,346,409 | 8/1982 | Ishida et al. | 358/280 |
| 4,365,304 | 12/1982 | Ruhman et al. | 382/51 |
| 4,445,093 | 4/1984 | Kohler | 307/351 |
| 4,538,227 | 8/1985 | Toraichi et al. | 364/414 |
| 4,636,953 | 1/1987 | Kageyama | 364/414 |
| 4,642,683 | 2/1987 | Alkofer | 358/284 |
| 4,652,999 | 3/1987 | Higashi et al. | 364/414 |

OTHER PUBLICATIONS

Boukharouba et al., "An Amplitude Segmentation Method Based on the Distribution Function of an Image", Computer Vision, Graphics and Image Processing, vol. 29, No. 1, pp. 47–59, Academic Press Inc., 1985.

"Histogram-Directed Processing of Digital Chest Images" by H. P. McAdams et al., Investigative Radiology, Mar. 1986, vol. 21, pp. 253–259.

"Histogram Concavity Analysis as an Aid in Threshold Selection" by Rosenfeld and De La Torre, IEEE Transactions on Systems, Man and Cybernetics, vol. SMC-13, 1983.

"Peak Detection Using Difference Operators" by Eklundh and Rosenfeld, IEEE Transactions on Pattern Analysis and Machine Intelligence, vol. PAMI-1, No. 3, Jul. 1979, pp. 317–325.

Primary Examiner—Leo H. Boudreau
Assistant Examiner—Steven Brim
Attorney, Agent, or Firm—Thomas H. Close

[57] ABSTRACT

In many digital image processing methods, it is desirable to selectively apply digital image processing to identifiable structures in the image. For this purpose it is known to select gray level thresholds between structures based upon the location of corresponding peaks in the gray level histogram of the digital image. However, it is a problem to automatically detect the locations of peaks in the histogram and to select the gray level thresholds. The present invention provides a method for automatically detecting the peaks and selecting gray level thresholds for segmenting a digital image into distinguishable structures including the steps of detecting peaks in a gray level histogram of the digital image by applying smoothing and differencing operators to the gray level histogram to generate a peak detection function wherein positive to negative zero crossings of the peak detection function represent the start of a peak, and maxima following such a zero crossing represents the end of a peak.

6 Claims, 9 Drawing Figures

DIGITAL IMAGE PROCESSING METHOD EMPLOYING HISTOGRAM PEAK DETECTION

TECHNICAL FIELD

This invention relates to the field of digital image processing, and more particularly to a method for processing a digital image to automatically detect peaks in a gray-level histogram of the digital image. A knowledge of the location of the peaks in the histogram is useful in selecting gray level thresholds for segmenting the digital image into distinguishable structures.

BACKGROUND ART

In digital image processing, and particularly in digital radiography, various image processing methods have been applied to the digital image to increase the diagnostic usefulness of the image. For example in the field of chest radiography, the goal of these image processing methods is to reproduce faithfully or to enhance the detail in both the lungs and the mediastinum in spite of their often large differences in subject contrast. However, when these image processing methods are applied to the entire digital radiographic image, the resulting enhancement in the lung field may be destructively high, potentially decreasing the detectability of small lesions. To overcome this problem, anatomical structure-selective processing of chest radiographs is desirable to prevent the detrimental effects to one structure from outweighing the improvement to another structure.

McAdams et al (see "Histogram Directed Processing of Digital Chest Images" by H.P. McAdams et al, Investigative Radiology, March 1986, Vol. 21, pp. 253–259) have discussed anatomical-structure selective image processing as applied to digital chest radiography. They used the lung field and the mediastinum histograms individually to determine a lung/mediastinum gray level threshold. The individual histograms for the lung field and the mediastinum were constructed by a trackball-driven cursor outlining technique. The gray level threshold was selected from the gray levels at which the two histograms overlap. McAdams et al. presented impressive results of anatomical structure-selective image processing guided by a lung/mediastinum gray level threshold. However, their method for determining the gray level threshold required human intervention, and therefore it was impractical for routine application. Rosenfeld and De La Torre (see "Histogram Concavity Analysis as an Aid in Threshold Selection", IEEE Transactions on Systems Man and Cybernetics, Vol. SMC-13, 1983) proposed an algorithm that used the image histogram concavity to automatically determine a gray level threshold for the images containing at most two major gray level subpopulations. Although capable of being automated, their method is very noise sensitive. Furthermore, the threshold determined by this method always lies closer to the tallest peak in the histogram which does not prove to be satisfactory for chest radiography in general.

Another problem encountered in the effort to automate the process of image segmentation is the difficulty in determining whether and where a peak in the histogram is actually located. This problem is aggravated by the presence of noise in the image, which causes the peaks to appear as clusters of spikes.

It is therefore the object of the present invention to provide an improved digital processing method for automatically detecting peaks in the histogram of a digital image and a method of selecting gray level thresholds for segmenting a digital image into distinguishable structures, that is free from the shortcomings noted above.

DISCLOSURE OF THE INVENTION

The object of the invention is achieved by a digital image processing method for automatically detecting peaks in a gray level histogram of the digital image characterized by applying smoothing and differencing operators to the gray level histogram to generate a peak detection function wherein positive to negative zero crossings in the function represent the start of a peak, and a maximum of the function following such a positive to negative zero crossing represents the end of a peak. Gray level thresholds are set at gray levels between the detected peaks.

MODES OF CARRYING OUT THE INVENTION

Figure 1:
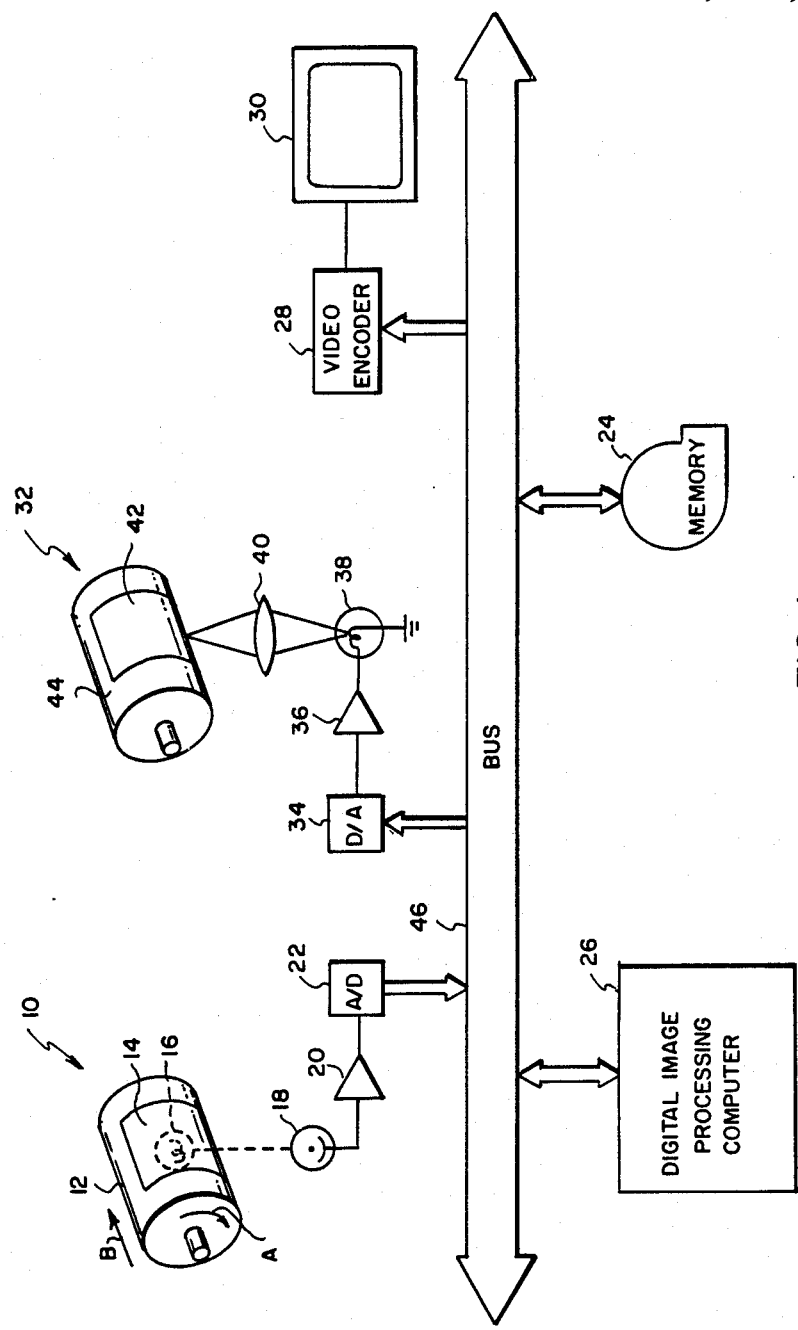
FIG. 1 is block diagram showing digital image processing apparatus useful for practicing the digital image processing method of the present invention.

FIG. 1 is a schematic diagram illustrating digital image processing apparatus useful for practicing the method of the present invention. The apparatus includes a scanning input portion which may comprise, for example, a drum scanner 10 for scanning transparencies such as conventional film radiographs. The drum scanner 10 includes a transparent drum 12 on which the radiograph 14 is mounted. A light source 16 is provided inside the drum to illuminate a spot on the radiograph. A photo sensor 18 receives the light signal modulated by the radiograph 14. The drum 12 spins on its axis in the direction of arrow A to form line scans, and the light source and sensor are moved relative to the radiograph in the direction of arrow B to form the scan raster.

The analog signal detected by the photosensor 18 is amplified by an amplifier 20 and is converted to a digital signal by an analog to digital converter 22. The scanning input portion of the digital image processing apparatus may also comprise a stimulable storage phosphor radiographic imaging system of the type shown in U.S. Pat. No. 3,859,257 issued to Luckey, January 1975 reissued as U.S. Pat. No. Re. 31,847, Mar. 12, 1985.

The digital radiographic signal is stored in a memory 24 and is processed by a digital image processing computer 26. The digital image processing computer 26 may comprise a general purpose digital computer, or a special purpose digital computer designed specifically for processing images. The digital image processing computer performs operations on a digital image, such as tone scale adjustment, and edge enhancement according to well known digital image processing methods. The processed digital image is converted to a video signal by signal processing electronics and video encoder 28 and is displayed on a video monitor 30.

Alternatively, the digital image is displayed by producing a film image on output scanning apparatus 32. The output scanning apparatus comprises a digital to analog converter 34 for converting the processed digital image signal to an analog signal, an amplifier 36 for amplifying the analog image signal, and a light source 38 modulated by the analog signal. Light source 38 is focused to a spot by a lens 40 onto a photosensitive medium such as photographic film 42 on a spinning drum 44. The various elements of the digital image processing apparatus communicate via a data and control bus 46.

Figure 2:
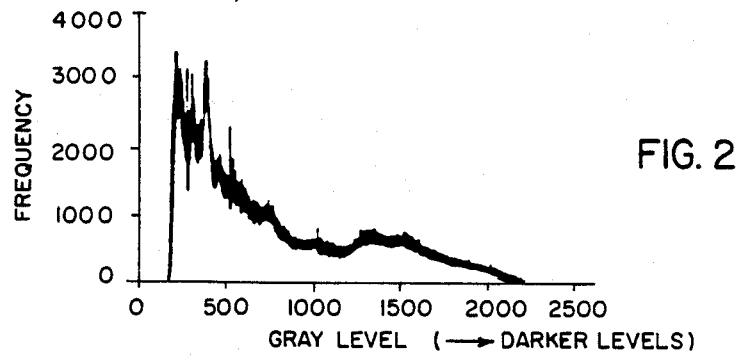
FIG. 2 is a histogram of a typical chest radiograph.

FIG. 2 is a histogram plot compiled from a typical chest radiograph that was scanned and digitized by apparatus such as shown in FIG. 1. The digital image signal was a 12 bit 1250×1400 pixel image. As can be seen from FIG. 2, it is not readily apparent from visual observation of the histogram, which cluster of peaks in the histogram belong to the lungs, and which to the mediastinum. The plot shown in FIG. 2 is typical of a histogram from a chest radiograph and illustrates the difficulty of selecting a gray level threshold between the lungs and mediastinum.

Figure 3:
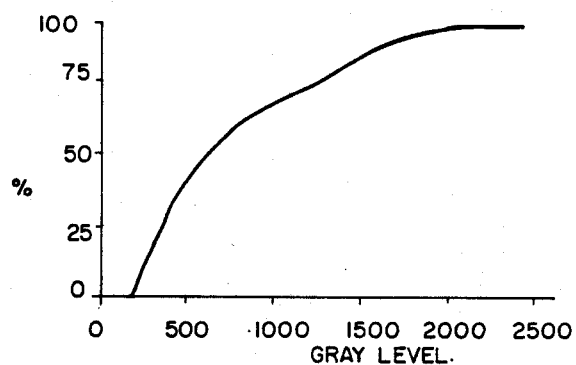
FIG. 3 is a graph showing the cumulative distribution function of the digital image represented by the histogram in FIG. 2.

The inventors have found, through experimentation, that a gray level threshold between the portions of the histogram representing the lung and mediastinum may be reliably selected by the method of the present invention. The method involves the steps of applying smoothing and differencing operations to the histogram to produce a peak detection function wherein a positive to negative zero crossing in the function indicates the beginning of a peak, and a maximum occurring after such a positive to negative crossing represents the end of a peak. According to one mode of practicing the invention, the peak detection function is generated by forming the cumulative distribution function F(n) of the gray levels in the image where $$F(n_i) = \Sigma h(n_j), n_j \leq n_i \quad (1)$$

h(n) is the image histogram and n represents the gray levels in the image $0 \leq n \leq 2^N - 1$ where N is the number of bits used to represent the digital image (e.g. N=12). A plot of F(n) from the histogram of FIG. 2 is shown in FIG. 3.

Next, the cumulative distribution function F(n) is smoothed by applying a sliding window average having a width w to produce a smoothed cumulative distribution function $\bar{F}_w(n)$. The peak detection function r(n) is generated by subtracting the smoothed cumulative distribution function $\bar{F}_w(n)$ from the original cumulative distribution function F(n) as follows:

$$r(n) = F(n) - \bar{F}_w(n) \quad (2)$$

The resulting function r(n) is a function having positive to negative zero crossings that correspond to the beginnings of peaks in the histogram, and maxima corresponding to the ends of the peaks in the histograms.

Figure 4:
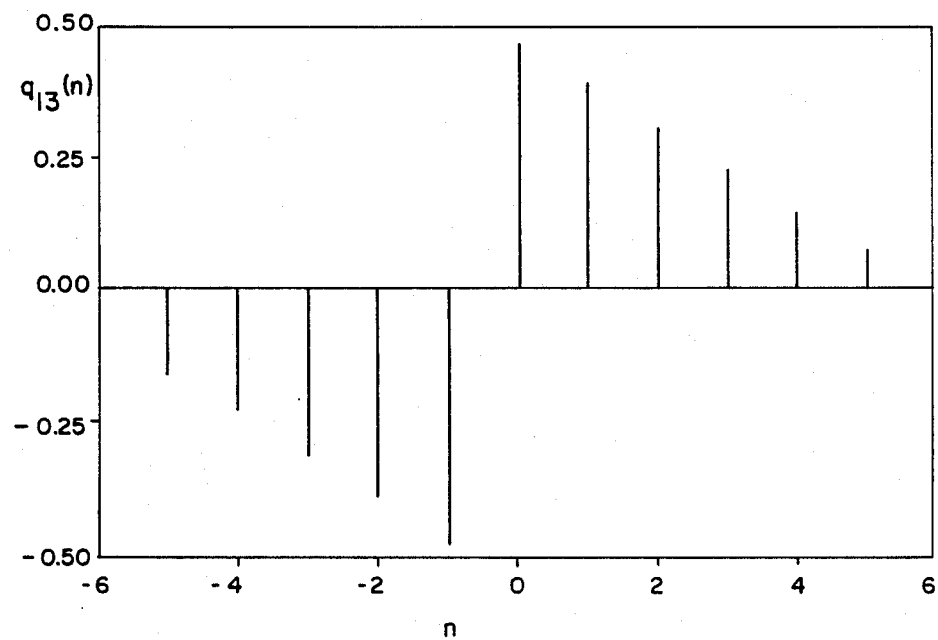
FIG. 4 is a graph illustrating the form of the smoothing and differencing operations employed in one mode of practicing the present invention.

Alternatively, the peak detection function r(n) can be computed directly from the histogram h(n) by the following convolution $$r(n) = q_w(n) * h(n)$$

where $q_w(n)$ is a function that can be expressed as the convolution of a "smoothing" kernel $s_w(n)$ and a "differencing" kernel d(n) as follows:

$$q_w(n) = d(n) * s_w(n) \quad (4)$$

where $$d(n) = \begin{cases} -1, n = -1 \\ 1, n = 0 \end{cases},$$

and $$s_w(n) = \begin{cases} 1/w, & n = -(w-1)/2 + 1 \\ [n + ((w-1)/2) + ws_w(n-1)]/w, & n = -(w-1)/2 + 2, \ldots, 0 \\ s_w(-n), & n = 1, 2 \ldots (w-1)/2 - 1 \end{cases}$$

a plot of $q_w(n)$ for a window size of w=13 is shown in FIG. 4.

Figure 5:
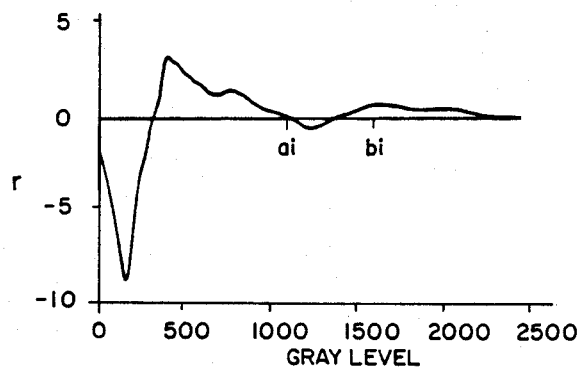
FIG. 5 is a graph showing a peak detection function generated by a smoothing window of width 541.

FIG. 5 shows the peak detection function r(n) generated from the histogram of FIG. 1 using a smoothing window w, 541 samples wide. In FIG. 5, $a_i$—is a positive to negative zero crossing, and indicates the gray level at which the ith peak starts $b_i$—is a maximum after the ith positive to negative zero crossing and indicates the gray level at which the ith peak ends.

The pair ($a_i$, $b_i$) characterizes the ith peak detected.

Figure 6:
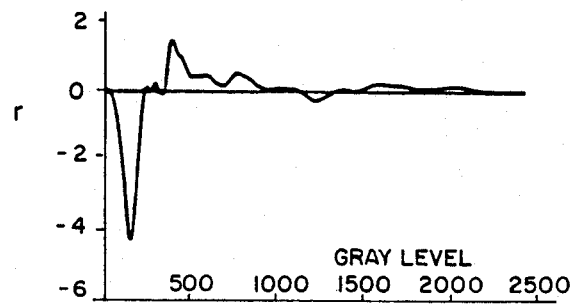
FIG. 6 is a graph showing the peak detection function generated by a smoothing window of width 271.

FIG. 6 shows the peak detection function r(n) generated with a window size w, 271 samples wide.

In the following description of the signal processing method, p(n)—represents the percentage of the total number of gray levels confined to the interval [o, n] (p(n)=100 F(n))

$n_T$—represents the gray level threshold between the lung and the mediastinum d—is an empirically derived constant representing the minimum separation in gray levels between two clusters of peaks $n_{Max}$—is the largest gray level present in the image.

The steps in the signal processing method for selecting the lung/mediastinum gray level threshold will now be described in pseudo-Fortran. This description is sufficient to enable a computer programmer of ordinary skill in the art to implement the method in a general purpose digital computer or a special purpose image processing computer.

| STEP NO. | |
|---|---|
| 0. | j = 1 |
| 1.1. | Compute $\bar{F}_w(n)$ with $w = w_j$ |
| 1.2. | Form r(n) = F(n) − $\bar{F}_w(n)$, or $q_w(n) * h(n)$ |
| 1.3. | Histogram peak detection: To detect peaks |

| STEP NO. | |
|---|---|
| | of the histogram consider the zeros and the local maxima of r(n). A zero-crossing to negative values indicates the start of a peak, i.e., the gray level at which the crossover occurs is $a_i$. Similarly, the next zero-crossing to negative values at the gray level $a_{i+1}$ ($a_{i+1} > a_i$) indicates the start of the (i+1)th peak. The gray level $b_i$, $a_i < b_i < a_{i+1}$, at which $r(b_i) = \text{Max } [r(n)], a_i < n < a_{i+1}$, determines the end point of the peak (see FIG. 5). That is, the ith peak is characterized by the pair ($a_i$, $b_i$), and the (i+1)th by ($a_{i+1}$, $b_{i+1}$) and so on. When the peak detection function has a negative value at n=o, it is assumed that the start of the first peak $a_1$ is at zero. |
| 1.4. | Terminate the search for the peaks at the gray level $n_S$. $n_S$ is determined from $p(n_{Max}-1) - P_S = p(n_s)$ (5) In other words, it is assumed that there does not exist a prominent detectable peak in the range where the upper $P_S$ percent (excluding the background level at $n_{Max}$) of the gray levels are confined. The value of the parameter $P_S$ is determined empirically by studying various chest histograms. Note: If $n_s$ is reached after a zero-crossing to negative values but before the next zero-crossing to negative values, then the end point of the last peak ($a_{K_1}$, $b_{K_1}$) is taken to be $n_s$ i.e., $b_{K_1} = n_s$. At this point a set of peaks A defined by $A \triangleq \{(a_i, b_i) : i = 1,2,\ldots,K_1\}$ where $0 \leq a_i \leq 2^N - 1$ and $0 \leq b_i \leq 2^N - 1$, is obtained. |
| 1.5. | Preprocessing: If $a_{i+1} - b_i < m$, for any $i = 1,2,\ldots,K_1-1$ then ($a_i$, $b_i$) and ($a_{i+1}$, $b_{i+1}$) are combined into a single peak to form ($a_i$, $b_{i+1}$). In this case the set A becomes: $A = \{(a_i, b_i) : i=1,2,\ldots K_2\}$ ($K_2 \leq K_1$). Parameter m is a constant that is determined experimentally. |
| 1.6. | Significance test: If the percentage of the gray levels confined to the peak ($a_i$, $b_i$), $i = 1,2,\ldots K_2$ is less than a certain value $P_{sig}$, i.e., $p(b_i) - p(a_i) < P_{sig}$, then the peak is considered to be insignificant and it is excluded from the set A. Thus for L (L $\geq$ 0) insignificant peaks A becomes: $A = \{(a_i, b_i) : i = 1,2,\ldots K_3\}$ where $K_3 = K_2 - L$ $P_{sig}$ is a value that is determined experimentally. |
| 1.7. | Classification: the peaks are classified into clusters as follows: ($a_1$, $b_1$) belongs to the first cluster. |
| (i) | i = 2 |
| (ii) | IF ($a_i - b_{i-1} < d$) THEN ($a_i$, $b_i$) and ($a_{i-1}$, $b_{i-1}$) belong to the same cluster ELSE ($a_i$, $b_i$) belongs to the next cluster; $a_i$ is the starting value of the next cluster, where d is a constant determined experimentally. |
| (iii) | i = i + 1 |
| (iv) | IF(i $\leq$ K$_3$) GO TO (ii) STOP |
| 1.8. | Decision: threshold selection |
| 1.8a. | If the peaks are classified into two clusters then the lung/mediastinum threshold is set to a gray level $n_T$ which lies between the end point of the first cluster and the starting point of the second cluster, that is $n_T = \text{int } [\mu b(1) + (1-\mu)a(2)]$, $0 \leq \mu \leq 1$, (6) where int[.] is the nearest integer truncation function, a(2) is the starting point of the second cluster, and b(1) is the end point of the first cluster. (Starting point of a cluster is defined to be the starting point of the first peak classified to that cluster. Similarly, end point of a cluster is defined to be the end point of the last peak classified to that cluster). |
| 1.8b. | If the peaks are classified into more than two clusters, the separation in gray levels between each successive clusters is computed. The pair with the largest separation is selected and the threshold is set to a gray level $n_T$ that lies between this pair, i.e., $n_T = \text{int } [\mu b(l) + (1-\mu)a(l+1)]$, $0 \leq \mu \leq 1$, (7) where Max $[a(x+1)-b(x)] = a(l+1) - b(l)$. x=1,2,...,M (M is the total number of clusters). |
| 1.8c. | If only one peak is detected ($K_3 = 1$) IF ($K_3 = 1$) THEN IF ($[p(n_{max}-1) - p(b_1)] < P_T$) THEN IF ( (j+1) $\leq$ J ) THEN w = $w_{j+1}$ = ($w_j$+1)/2   ! process can be repeated ! with a smaller window size GO TO STEP 1.1 ELSE Histogram is essentially unimodal. A threshold does not exist. END IF ELSE Histogram is essentially unimodal but a threshold can be set. $n_T = b_1$ END IF END IF Note: $P_T$ is an experimentally determined percentage criterium. J is a user specified parameter. |
| 1.8d. | If the peaks are classified into one cluster (M=1): IF ($[p(n_{max}-1) - p(b_{K_3})] > P_T$) THEN $n_T = b_{K_3}$ ELSE IF ( (j+1) $\leq$ J) THEN w = $w_{j+1}$ = $2w_j - 1$   ! process can be repeated ! with a larger window size GO TO STEP 1.1 ELSE Peaks are treated as clusters and decision is made according to (1.8b). END IF END IF |

The signal processing method was applied to the digital chest radiograph having the histogram shown in FIG. 2. The parameters were set as follows:

J=2
$\mu$=0
N=12
w=541, 271
$P_s$=10.0
m=15
$P_{sig}$=1.0
d=235
$P_T$=20.0

At the end of STEP 1.6 of the method the following sets of peaks were obtained.

$A = \{(0,409), (1139, 1567)\}$ (w = 541)

$A = \{(37,255), (274,301), (326,401), (1160,1567)\}$ (w = 271)

Figure 7:
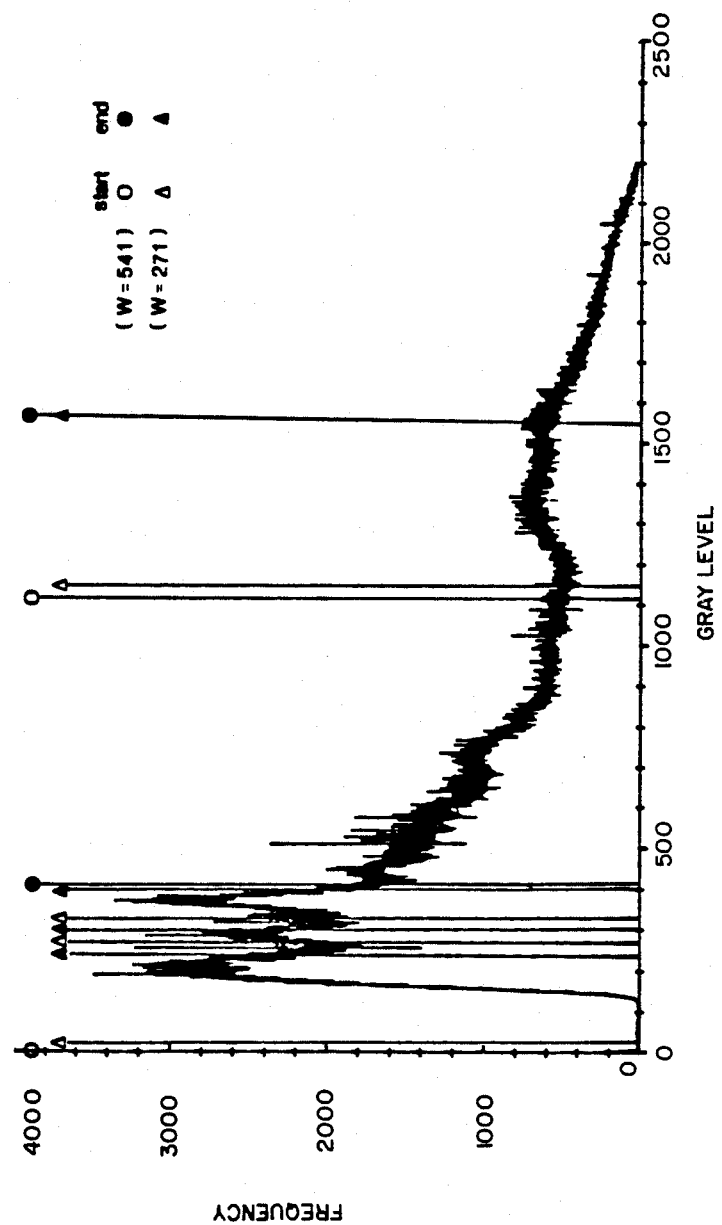
FIG. 7 is an enlarged view of the histogram shown in FIG. 2, illustrating the locations of the detected peaks for a smoothing window of width 541 and 271 respectively.

The peaks are illustrated on the image histogram in FIG. 7.

The signal processing method was tested with various chest radiographs to empirically determine the initial window size $w=w_1$, the separation criterion d, and the percentage criterion $P_T$. In almost all cases a threshold was determined without the need to modify the initial window size $w=w_1$.

The threshold selection method according to the present invention was applied to an assortment of digital chest radiographs to select gray level thresholds between the lungs and the mediastinum. Then various anatomical structure selective image enhancement procedures were applied to the digital chest radiographs using the selected gray level thresholds. The image enhancement procedures included anatomical selective tone scale adjustment and edge enhancement. In these tests, the gray level thresholds automatically selected by the method of the present invention were found to be appropriate and yielded diagnostically useful results.

Steps 1.7 and 1.8 of the above method exploit the a priori knowledge of the existence of at most two well-separated (at least by d in gray levels) major histogram clusters corresponding to the mediastinum and the lung field. In general, images can have any number of major structures each of which correspond to a single, or a group of histogram peaks (clusters). The thresholds separating the major structures are then set to gray levels between these peaks. For images other than chest radiographs, the above method can be generalized as follows: steps 1.1 through 1.6 are iterated twice with window sizes $w=w_1$ and $w=w_2$ ($w_1>w_2$) to obtain two sets of peaks:

$$A_1 = \{(a_i, b_i): i = 1,2, \ldots, I\} \ (w = w_1)$$

and $$A_2 = \{(c_k, d_k): k = 1,2, \ldots, K\} \ (w = w_2).$$

($K \geq I$ since the sensitivity of the peak detection increases with decreasing window size (see FIG. 7)). Based on selection rules, peaks are selected from these two sets to form a final set C of the so-called 'major' peaks. The thresholds are then set to gray levels between the major peaks.

The $A_2$-intervals (or equivalently the $A_2$-peaks), i.e., $(c_k,d_k)$'s may overlap with the $A_1$-intervals (or equivalently the $A_1$-peaks), i.e., $(a_i,b_i)$'s. If the relative population of the gray levels contained in the overlap exceeds a predetermined value then the overlap is said to be 'significant'. Nonoverlapping peaks, or insignificantly overlapping peaks are called 'independent' peaks. The overlapping and the independent peaks are determined by the overlap detection procedure described below. The set C of the major peaks is formed via the following rules:

R1. An $A_1$-peak qualifies for the set C if
  (i) it is an independent peak,
  (ii) it is not an independent peak but total number of the significant overlaps that are 'major' overlaps is less than t (if an $A_2$-peak overlaps significantly with an $A_1$-peak then the overlap is a major overlap if the ratio of the number of gray levels contained in the overlap to the total number of gray levels contained in the $A_1$-peak exceeds the value $R_{maj}$) and t is a predetermined parameter.

R2. An $A_2$-peak qualifies for the set C if
  (i) it is an independent peak,
  (ii) it is not independent and its overlap with the $A_1$-peak is a major overlap and the total number of $A_2$-peaks that have major overlaps with the $A_1$-peak is at least t,
  (iii) it is not independent and its overlap with the $A_1$-peak is not a major one but there exist at least t other $A_2$-peaks with major overlaps with that $A_1$-peak. In this case adjacent peaks that do not have major overlaps with the $A_1$-peak are combined into single peaks.

The final set C can be defined as $$C = \{(e_m, f_m): m = 1,2, \ldots, M\},$$

where $(e_m, f_m) \in A_1 \cup A_2$. The thresholds are then set to gray levels $$n_{T_1}, n_{T_2}, \ldots, n_{T(M-1)}$$

where $$n_{T_l} = \text{int}\{\mu f_l + (1-\mu)e_{l+1}\}, l = 1,2 \ldots, (M-1)$$

and $$0 \leq \mu \leq 1.$$

the overlap detection procedure that determines the overlapping and the independent peaks will now be described in pseudo-Fortran (significant overlaps will be denoted by the '→' sign).

```
2.1.  i = 1
2.2.  k = 1
2.3.  IF (c_k ≥ a_i AND b_i > d_k) THEN    ! A2-peak is
                                              contained
        (c_k,d_k) → (a_i,b_i)               ! in the A1-peak
        k = k + 1
        IF (k > K) GO TO 2.7
        GO TO 2.3
      END IF
      IF (c_k ≤ a_i AND d_k ≥ b_i) THEN    ! A1-peak is
                                              contained
        a_i = c_k                           ! in the A2-peak
        b_i = d_k                           ! replace the
                                              A1-peak
        k = k + 1                           ! with the A2-peak
        IF (k > K) GO TO 2.7
        GO TO 2.3
      END IF
2.4.  IF (c_k ≤ a_i ≤ d_k) THEN            ! (c_k,d_k) overlaps
                                              with
                                            ! (a_i,b_i) from left
        P_k^L = [P(d_k)-p(a_i)]/[p(d_k)-p(c_k)]
                                            ! left overlap
                                              percentage
        IF(P_k^L ≥ P_L)THEN                 ! overlap signifi-
                                              cance
                                            ! check. P_L is the
                                              left
                                            ! overlap signifi-
                                              cance
                                            ! measure
          (c_k,d_k) → (a_i,b_i)
          k = k + 1
          IF (k > K) GO TO 2.7
          GO TO 2.3
        ELSE
          (c_k,d_k) is independent
          k = k + 1
          IF (k > K) GO TO 2.7
          GO TO 2.3
        END IF
      END IF
2.5.  IF (c_k ≤ b_i ≤ d_k) THEN            ! (c_k,d_k) overlaps with
```

-continued
```
                              ! (aᵢ,bᵢ) from right
         Pₖᴿ = [p(bᵢ)−p(cₖ)]/[p(dₖ)−p(cₖ)]   ! right overlap
                                              percentage
         IF (i < I) PₖᴸL = [p(dₖ)−p(aᵢ₊₁)]/[p(dₖ)−p(cₖ)]
                              ! check the possibility
                              ! of
                              ! left overlap with
                              ! (aᵢ₊₁,bᵢ₊₁)
           IF (Pₖᴿ ≧ Pₖᴸ) THEN  ! right overlap
             IF (Pₖᴿ ≧ Pᴿ) THEN  ! overlap signifi-
                                  cance
                                 ! check. Pᴿ is the
                                  right
                                 ! overlap signifi-
                                  cance
                                 ! measure
               (cₖ,dₖ) → (aᵢ,bᵢ)
               k = k + 1
               IF (k > K) GO TO 2.7
               GO TO 2.3
             ELSE
               (cₖ,dₖ) is independent
               k = k + 1
               IF (k > K) GO TO 2.7
               GO TO 2.3
             END IF
           ELSE                 ! left overlap with
                                  (aᵢ₊₁,bᵢ₊₁)
             IF (Pₖᴸ ≧ Pᴸ) THEN  ! overlap signifi-
                                  cance check
               (cₖ,dₖ) → (aᵢ₊₁,bᵢ₊₁)
               k = k + 1
               i = i + 1
               IF (k > K) GO TO 2.7
               GO TO 2.3
             ELSE
               (cₖ,dₖ) is independent
               k = k + 1
               IF (k > K) GO TO 2.7
               GO TO 2.3
             END IF
           END IF
         END IF
2.6.     IF (dₖ < aᵢ) THEN       ! (cₖ,dₖ) lies to the
                                  left of
           (cₖ,dₖ) is independent ! (aᵢ,bᵢ) with no overlap
           k = k + 1
           IF (k > K) GO TO 2.7
           GO TO 2.3
         ELSE                    ! (cₖ,dₖ) lies to the
                                  right of
                                 ! (aᵢ,bᵢ) with no overlap
           IF (i ≧ I) THEN        ! it lies to the right
                                  of the
                                 ! last A₁-peak
             (cₖ,dₖ) is independent
             k = k + 1
             IF (k > K) GO TO 2.7
             GO TO 2.3
           END IF
           DO LL = i + 1, I      ! check for possible
                                  overlaps
                                 ! with upcoming
                                  A₁-peaks
             IF (a_LL ≦ dₖ ≦ b_LL) THEN  ! an overlap exists
               i = LL
               GO TO 2.3
             ELSE
               CONTINUE
             END IF
           ENDDO
           (cₖ,dₖ) is independent  ! no overlap
           k = k + 1
           IF (k > K) GO TO 2.7
           GO TO 2.3
         END IF
Note:    Pᴸ and Rᴿ are the left and the right
         overlap significance criteria respectively.
         Pᴸ = Pᴿ = P_O without loss of
         generality. P_O is determined
         heuristically.
2.7.     A₁-peaks that either do not overlap with
         any of the A₂-peaks or overlap with
         A₂-peaks insignificantly are independent
         peaks.
         STOP
```

Figure 8:
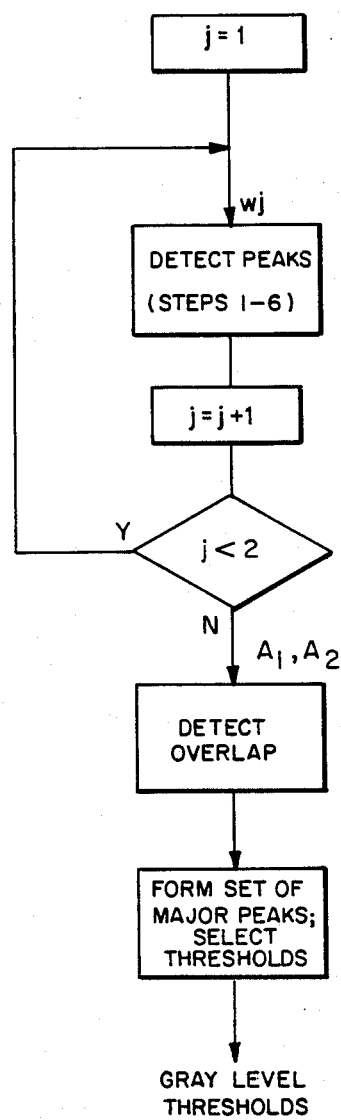
FIG. 8 is a flow chart of a generalized peak detection method according to the present invention.
Figure 9:
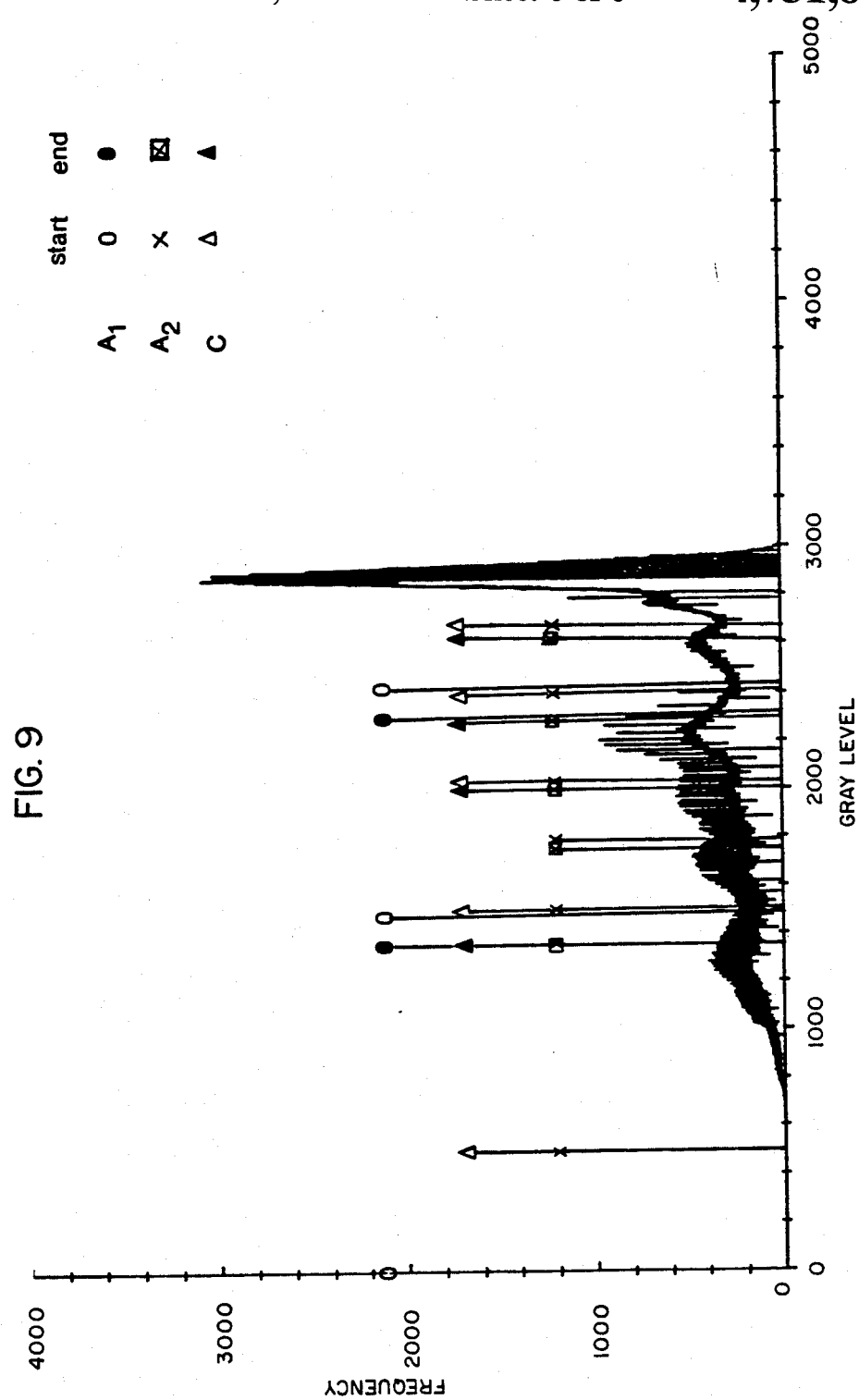
FIG. 9 is a histogram of a digital radiographic image of human hands.

The window sizes $w_1$ and $w_2$ and the criteria $R_{maj}$, and t can be determined empirically for the class of images that is of interest. The general threshold-selection technique is illustrated in FIG. 8. The general technique was applied to a radiograph of human hands having the histogram shown in FIG. 9. The parameters were set as follows:

$\mu = 0$
$N = 12$
$w_1 = 541$
$w_2 = 271$
$t = 1$
$P_S = 10.0$
$m = 5$
$P_{sig} = 5.0$
$P_L = P_R = P_O = 90.0$
$R_{maj} = 0.45$ The following sets of peaks were obtained with $w_1 = 541$ and $w_2 = 271$:

$A_1 = \{(0,1385),(1484,2319),(2436,2902)\} (w_1 = 541)$ and $A_2 = \{(509,1385),(1496,1744),(1785,2006),(2014,2303),(2428,2623),(2662,2902)\} (w_2 = 271)$.

The set C of major peaks was $C = \{(509,1385),(1496,2006),(2014,2303),(2428,2623),(2662,2902)\}.$ The corresponding thresholds $n_{T1} = 1496$, $n_{T2} = 2014$, $n_{T3} = 2428$, and $n_{T4} = 2662$ provided a satisfactory segmentation of the hands radiograph.

INDUSTRIAL APPLICABILITY AND ADVANTAGES

The present invention provides a method for automatically detecting peaks in a gray level histogram of a digital image, and for selecting the gray level threshold values between distinguishable structures in the digital image. The method is useful in the field of digital image processing, particularly in the field of digital radiography. The method has the advantages that peaks are reliably detected in the presence of noise and gray level threshold values are selected automatically without the need for human intervention, thereby simplifying the digital image processing procedure making it more practical and useful.

We claim:

1. In a method of processing a digital image by computer, including the steps of forming a gray-level histogram of the digital image, forming a peak detection function from the gray-level histogram, employing the peak detection function to detect peaks in the histogram, and employing the location of detected peaks to process the image, the improvement wherein said step of forming a peak detection function comprises the steps of:

a. forming a cumulative distribution function from said gray-level histogram;

b. smoothing said cumulative distribution function with a sliding window average of size w to produce a smoothed cumulative distribution function; and c. subtracting said smoothed cumulative distribution function from said cumulative distribution function to produce said peak detection function; and wherein said step of employing the peak detection function to locate peaks in the histogram includes the steps of:

a. identifying positive to negative zero crossings of the peak detection function as the start of a detected histogram peak, and b. identifying a maximum following such a positive to negative zero crossing as the end of a detected histogram peak.

2. In a method of processing a digital image by computer, including the steps of forming a gray-level histogram of the digital image, forming a peak detection function from the gray-level histogram, employing the peak detection function to detect peaks in the histogram, and employing the location of detected peaks to process the image, the improvement wherein said step of forming a peak detection function comprises the step of: convolving the histogram with a function $q_w(n)$ of the form:

$$q_w(n) = d(n) * s_w(n)$$

where $$d(n) = -1, n = -1$$
$$1, n = 0,$$

and $$1/w, n = -[(w-1)/2] + 1$$
$$s_w(n) = [n + ((w-1)/2) + ws_w(n-1)]/w, n =$$
$$-[(w-1)/2] + 2, \ldots, 0 \; s_w(-n), n = 1,2 \ldots [(w-1)/2] - 1.$$

where w is an adjustable parameter representing the size of an averaging window, and wherein said step of employing the peak detection function to loacate peaks in the histogram includes the steps of:

a. identifying positive to negative zero crossings of the peak detection function is the start of a detected histogram peak, and b. identifying a maximum following such a positive to negative zero crossing as the end of a detected histogram peak.

3. The digital image processing method claimed in claims 1 or 2, further including the steps of:

a. employing a relatively wide window size w to form a first peak detection function;

b. employing a relatively narrow window size w to form a second peak detection function; and c. forming a set of detected peaks located from said first and second peak detection functions based upon the percentage of overlap between the peaks located by said first and second peak detection functions.

4. The digital image processing method claimed in claim 3, wherein said step of forming a set of detected peaks further includes basing said selection on the number of peaks detected by said second peak detection function that overlap with peaks detected by said first peak detection function.

5. The digital image processing method claimed in claim 1 or 2, wherein said digital image processing is of the type including the step of determining gray-level thresholds for segmenting the digital image into distinguishable structures, the gray-level thresholds being located between detected peaks in the histogram, and wherein said step of employing the peak detection function to detect peaks further includes the step of:

classifying peaks into clusters of peaks based upon the gray-level separation between the end of a detected peak, and the start of the next detected peak.

6. The digital image processing method claimed in claim 5, wherein the step of determining the gray-level thresholds is employed to determine the gray-level threshold between lung and mediastinum in a digital chest radiograph, further comprising the steps of:

a. if the peaks are classified into two clusters, setting the gray-level threshold at a convex combination of the gray-level at which the first cluster ends and the gray-level at which the second cluster starts;

b. if the peaks are classified into more than 2 clusters, determine the two adjacent clusters having the largest gray-level separation and set the gray-level threshold at a convex combination of the gray-level at which the first cluster ends and the gray-level at which the second cluster starts;

c. if there is only one peak, and if at least $P_t$ percent of the total number of gray-levels are confined between the largest gray-level ($n_{max}$) and the gray-level at which the peak ends, setting the threshold to the gray-level at which the peak ends; if the $P_T$ percent criterion does not hold, then repeat the peak detection and classification steps with a smaller averaging window size w and repeat step (a) et seq. if at the end of a given number of repetitions there is still one peak detected and the percent criterion does not hold, then the histogram is essentially unimodal and a threshold does not exist; and d. if the peaks are classified into only one cluster, and if at least $P_T$ percent of the total number of gray-levels are confined between the largest gray-level ($n_{max}$) and the gray-level at which the cluster ends, setting the threshold to the gray-level at which the cluster ends, if the $P_T$ percent criterion does not hold, then repeat the peak detection and classification steps with a larger averaging window size w and repeat step (a) et seq. if at the end of a given number of repetitions the peaks are classified into only one cluster and the $P_T$ percent criterion does not hold, then treat the peaks as clusters and use step (b) for decision.

* * * * *